June 30, 1970  E. C. KOLB  3,517,570

MULTI-POSITION ROTARY ACTUATING MECHANISM

Filed Aug. 7, 1968  2 Sheets-Sheet 1

INVENTOR.
EDGAR C. KOLB
BY
ATTORNEY.

INVENTOR.
EDGAR C. KOLB
ATTORNEY.

United States Patent Office 3,517,570
Patented June 30, 1970

3,517,570
MULTI-POSITION ROTARY ACTUATING MECHANISM
Edgar C. Kolb, Freeport, Ill., assignor to Honeywell Inc., Minneapolis, Minn., a corporation of Delaware
Filed Aug. 7, 1968, Ser. No. 750,841
Int. Cl. G05g 5/06; H01h 13/22
U.S. Cl. 74—527                      7 Claims

ABSTRACT OF THE DISCLOSURE

A multi-position rotary actuating mechanism which can be used with a switch device, for example, whereby maintained, momentary, or maintained-momentary operating modes of the mechanism, and hence the switch device, can be provided dependent upon the inclusion of detent means and the inclusion and location of rotation return means in the mechanism and whereby the number of discrete positions of the mechanism can be varied by way of selectively located rotation limiting means.

---

The present invention is directed to a multi-position rotary actuating mechanism wherein the operating mode can be selectively maintained, momentary, or maintained-momentry and whereby the change in mode can be accomplished merely by the inclusion and/or repositioning of certain elements of the mechanism. The present invention is further directed to a multi-position rotary actuating mechanism having the features just set forth wherein the number of discrete positions can be selectively varied by rotation limiting means which may include some of said certain elements.

Rotary actuating mechanisms which incorporate a maintained mode (that is, the mechanism remains in the position to which it is actuated), which incorporate a momentary mode (that is, the mechanism returns from its actuated position to its original position after the actuating force has been removed) or which incorporate a combination of the two modes (that is, maintained-momentary) are of course old in the art. Likewise old in the art are multi-position rotary actuating mechanisms. While such various mechanisms together provide the forementioned modes in a great variety of combinations and in various multi-position configurations, it is desirable from an economic standpoint that a single such mechanism selectively provide the modes and combinations in various multi-position configurations and do so by utilizing a minimum number of common parts.

The present invention discloses teachings which allow for the selective provision of such modes and combinations by the mere inclusion and/or repositioning of elements of a multi-position rotary actuating mechanism. Thus in the preferred embodiment a rotary actuating member is associated with a stationary member and is arranged to be moved relative thereto. By the inclusion of detent means between said members arranged to operate at discrete positions, a maintained mode can be provided. By the inclusion of spring return means which may be in the form of a double ended torsion spring and pickup pins therefor, a momentary mode can be introduced. By the inclusion of both means, a maintained-momentary mode can be provided. Further because of the location adjustability of the pickup pins with respect to the double ended torsion spring, various combinations of the maintained-momentary mode are possible. In short, the detent means and spring return means of the present invention are so associated with the rotary and stationary members that the various modes and combinations can be selectively provided by inclusion of these means and positioning of the latter means in different relative positions.

The present invention further discloses teachings which allow for the mechanism just described to provide various multi-position configurations, for example, two-position, three-position or four-position. This is accomplished by limiting the range of movement of the mechanism through the utilization of stop means which may be in the form of a shoulder associated with the rotary actuating member and selectively located pickup pins some of which may also be utilized in the spring return means.

Therefore, it is an object of the present invention to provide a multi-position rotary actuating mechanism which allows maintained, momentary, and maintained-momentary operations dependent upon the inclusion of detent means and the inclusion and location of spring return means associated with the mechanism.

A further object of this invention is to provide a mechanism of the type just described whereby the mode of operation can be easily varied by mere inclusion and/or repositioning of certain elements of the mechanism.

Another object of this invention is to provide a mechanism of the type just described which allows for various discrete position configurations by selectively locating pickup means some of which may be part of the spring return means.

These and other objects will become more apparent from a reading of the following specification and appended claims taken with the drawing in which:

Figure 1:
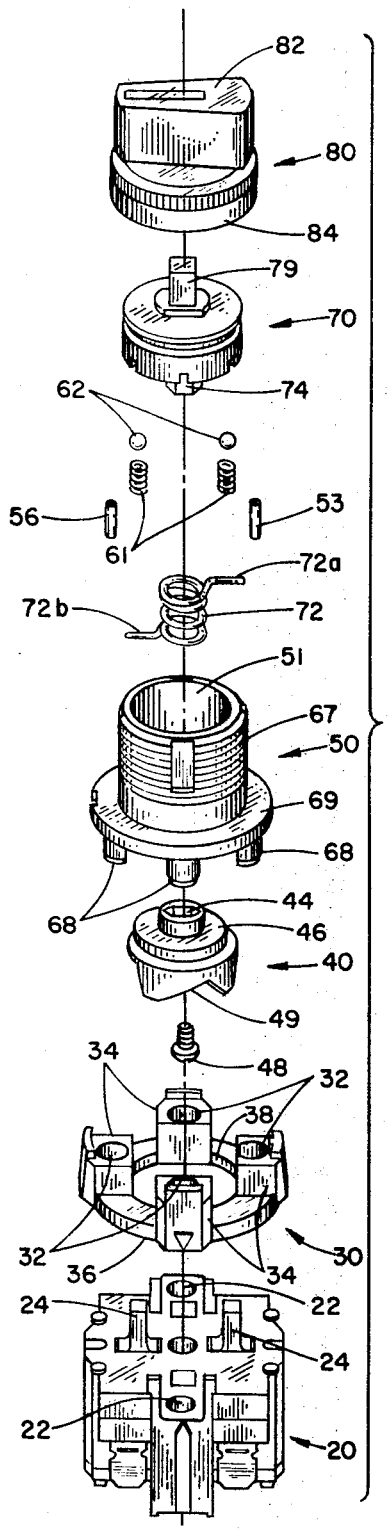
FIG. 1 is an exploded perspective view of a switch arrangement comprising a switch device and a rotary actuating mechanism for incorporating the invention.

What is popularly known as a heavy-duty, oil-tight switch is shown in explosion in FIG. 1 and comprises a switch block 20, a spacer member 30, a cam member 40, a cup-shaped stationary support member 50, a cylindrically-shaped rotary actuating member 70 and a manual driver 80.

Figure 2:
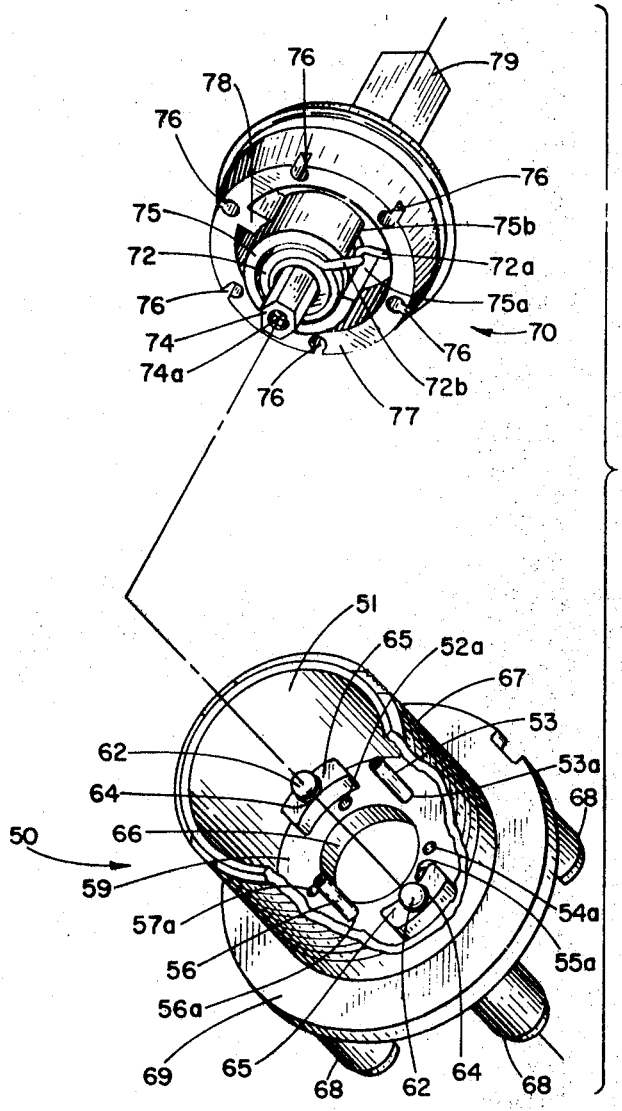
FIG. 2 is an exploded perspective view of the basic elements of the rotary actuating mechanism showing the invention.

Disposed within cylindrical opening 51 of the support member 50 are pickup means in the form of a pair of roll pins 53 and 56 which are located, referring to FIG. 2, in two of six openings 52a–57a provided in base portion 59. The openings 52a–57a are each located at the same radial distance from the longitudinal axis of the support member 50.

A pair of coil springs 61 and a pair of balls 62 are arranged to be disposed, again referring to FIG. 2, in diametrically opposed openings 64, which are somewhat larger than the balls 62, located in pads 65 extending from the base 59. The function of the roll pins, openings, coil springs and balls will be set forth below.

Resilient return means in the form of a double ended torsion spring 72 is arranged to be disposed about shaft 74 of the actuating member 70 and, referring to FIG. 2, within a collar 75 disposed thereabout with extremities 72a and 72b each engaging sides 75a and 75b, respectively, of a slot provided in the collar. Again, the function of the double ended torsion spring will be commented on below.

The actuating member 70 includes, referring to FIG. 2, six openings 76 located in the bottom of rim 77 thereof which are spaced at 60° intervals and which are somewhat smaller than the balls 62. The support member 50 and the actuating member 70 when assembled are so arranged that balls 62 under the bias of the coil springs 61 cooperate with the openings 76 so as to provide a detent arrangement and discrete positioning therebetween when the balls are associated in the openings. This occurs of course upon 60° incremental movements of the actuating member 70 with respect to the support member 50.

The six openings 52a-57a, as indicated previously, are each located at the same radial distance from the longitudinal axis of the support member 50 and are shown with roll pins 53 and 56 disposed in two of them. With the actuating member 70 disposed within the opening 51 of the support member 50, the roll pins 53 and 56 are arranged to be engaged by the extremities 72a and 72b of the assembled double ended torsion spring 72 as well as by rotation limiting or stop means in the form of a shoulder 78 provided between the collar 75 and the rim 77 of the actuating member 70 in a manner which will be described below to provide the various modes and combinations of maintained, momentary and maintained-momentary as well as to provide the various multi-position configurations. Such modes, combinations and configurations are dependent upon the relative location of the pins, the extremities of the double ended torsion spring and the shoulder.

With the roll pins 53 and 56, the coil spring 61 and the balls 62 in place in the support member 50 and with the double ended torsion spring in place in the actuating member 70, as shown in FIG. 2, the two members can be assembled. This accomplished by merely sliding actuating member 70 into the opening 51 of the support member 50 with the shoulder 78 in the proper orientation as will be described below and with the shaft 74 extending through the opening 66 of the base 59.

Cam member 40 includes a stepped opening 44 which is arranged to accept the lower extremity of the shaft 74. Hub 46 of the cam member 40 is arranged to slidably rotate in the opening 66 of the support member 50. Screw 48 is disposed through an opening, not shown, in the hub 46 which communicates with the opening 44 and is arranged to be accepted by threaded opening 74a located in shaft 74. The screw thus fastens the support member 50, the actuating member 70 and the cam member 40 together. These elements in assembly, in effect, are the multi-position actuating mechanism.

To the assembly just described, the manual driver 80, which is comprised of an operating knob 82 integral with but rotatable with respect to a mounting nut 84, is arranged to be secured. Thus shaft 79 of the actuating member 70 is accepted in a complementary opening, not shown, of the knob 82 and the nut 84 is secured to threaded portion 67 of the support member 50.

The support member 50 includes four studs 68 which extend downwardly from flange 69. These studs 68 are arranged to be disposed in stepped openings 32 located in protrusions 34 of the spacer member 30.

To provide an assembled heavy-duty, oil-tight switch the switch block 20 is secured against bottom surface 36 of the spacer member 30 and to the rotary actuating mechanism by means of screws, not shown, which pass through openings 22 of the switch block 20, the corresponding openings 32 of the spacer member 30 and into threaded openings, not shown, provided in the studs 68.

The spacer member 30 by means of the protrusions 34 allows clearance for the cam member 40 and the opening 38 of the spacer member 30 allows clearance for plungers 24 of two switch mechanisms, not shown, of the switch block 20. Cam surfaces 49 of the cam member 40 thus can cooperate with the plungers 24 upon actuation of the rotary actuating mechanism to vary the condition of the switch mechanisms.

While the detail construction of the preferred embodiment of the invention has been described with respect to FIGS. 1 and 2, the operation thereof and the various modes, combinations and configurations will be described with respect to FIGS. 3-11. In these figures, the rotary actuating mechanism including the invention is shown in very basic form. Thus the top plane view of the support member 50 with the balls 62 and pads 65, openings 52a-57a and the appropriate pins 52-57 is shown along with the shoulder 78 of the rotary actuating member 70 and where appropriate the extremities 72a and 72b of the double ended torsion spring 72.

In the mechanisms of each of FIGS. 3-11, the shoulder 78 is oriented in the same position and so that the detent arrangement set up between the balls 62 of the support member 50 and a pair of openings 76 of the rotary actuating member 70 is encountered and a maintained position results. Of course the detent arrangement is also encountered upon each successive 60° rotation of the mechanism.

Figure 3:
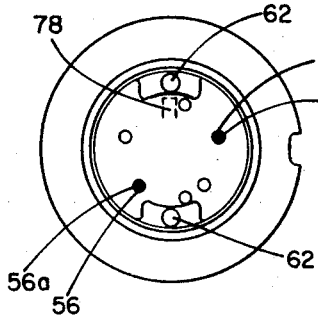
FIGS. 3, 4 and 5 are views of the invention utilized in various four-position configurations incorporating maintained and maintained-momentary modes.
Figure 4:
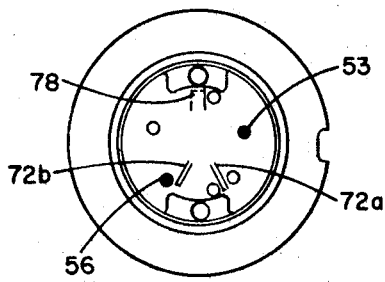
Figure 5:
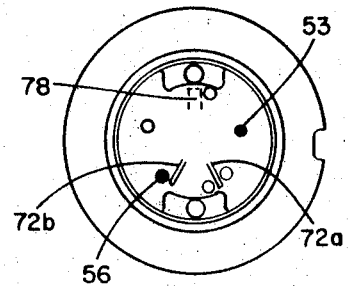

FIGS. 3, 4 and 5 are directed to a four-position rotary actuating mechanism in which 180° of rotation is required to provide the four positions.

In FIG. 3, a four-position maintained rotary actuating mechanism is set forth. With the pins 53 and 56 located in the openings 53a and 56a as shown, the shoulder 78, through the rotary actuating member, can be rotated from the shown maintained position, one-position clockwise, that is, through 60° before encountering the pin 53, which limits further clockwise rotation, the two-positions counterclockwise from the shown maintained position, that is, through 60° and 120° before encountering the pin 56, which limits further counterclockwise rotation. At each discrete maintained position, that is, the position shown, 50° clockwise, 60° counterclockwise and 120° counterclockwise, the detent arrangement set up between the balls 62 of the support member 50 and the openings 76 of the rotary actuating member 70 is encountered and maintains the rotary actuating member in place with respect to the support member.

A four-position rotary actuating mechanism having three maintained positions and one momentary position is shown in FIG. 4. This requires utilization of the double ended torsion spring, hence the showing of extremities 72a and 72b. Maintained positions are as shown and at the 60° position counterclockwise and at the 120° position counterclockwise. Ultimately the shoulder 78 engages the pin 56 to limit rotation. It should be noted that in this embodiment pin 53 is of such a height that the extremity 72a passes over it but the shoulder 78 does not. Movement of the rotary actuating mechanism clockwise from the position shown causes the double ended torsion spring to "wind up" to provide a return force greater than the maintained force of the detent arrangement and consequently a momentary condition is provided. A limitation of the "wind up" is brought about by the engagement of the shoulder 78 with the pin 53. It will be noted that extremity 72a does not cause a "wind up" of the double ended torsion spring in its counterclockwise movement as there is no pin for it to engage.

In FIG. 5, two maintained and two momentary positions are provided. In the position shown, the mechanism is in a maintained position whereas 60° clockwise rotation causes engagement of the extremity 72b with the pin 56 and the "wind up" referred to previously is encountered. Again, the "wind up" is limited by the engagement of the shoulder 78 with the pin 53. From the position shown, counterclockwise movement results in the second maintained position being encountered after 60° rotation. A further 60° counterclockwise movement results in the extremity 72a engaging the pin 53 (which in this embodiment is higher than in that of FIG. 4), "wind up" once again ensues, followed by the shoulder 78 limiting movement upon engagement with the pin 56.

FIGS. 6, 7, 8 and 9 are directed to a three-position rotary actuating mechanism in which 120° rotation is required to provide the three positions.

Figure 6:
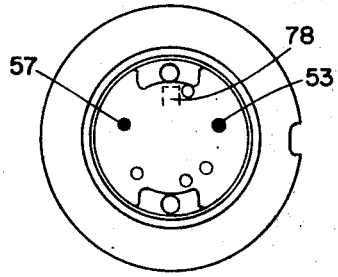
FIGS. 6, 7, 8 and 9 are views of the invention utilized in various three-position configurations incorporating maintained and maintained-momentary modes.

A three-position maintained arrangement is shown in FIG. 6 such that 60° rotation of the mechanism in either a clockwise or counterclockwise direction from the position shown results in the detent arrangement being encountered and the shoulder 78 engaging the pins 53 and 57.

Figure 7:
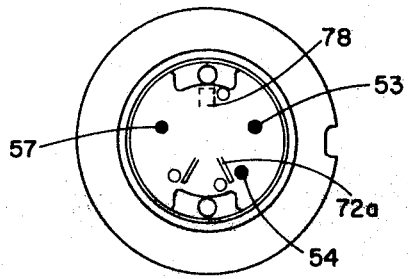

In FIG. 7, a two-maintained, one-momentary position mechanism is disclosed. One of the maintained positions is as shown, the other arises after clockwise rotation of 60° whereupon the shoulder 78 encounters pin 53. Counterclockwise rotation of 60° from the position shown causes the extremity 72a to engage pin 54, and thus provide for momentary action, followed by the shoulder 78 engaging the pin 57.

It will be noted that in the mechanisms of FIG. 4 and FIG. 5, a momentary position(s) is provided and the same pins are also utilized to limit rotation. In FIG. 7, the mechanism also allows for a momentary position but the pin required to provide this function is in addition to those utilized to limit rotation.

Figure 8:
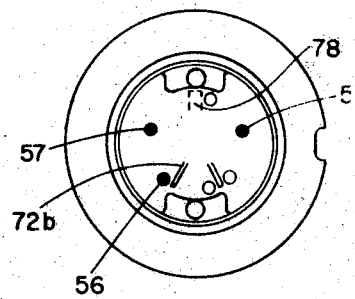

In FIG. 8, a two-maintained, one-momentary position mechansm is shown. The operation of this mechanism is essentially the reverse of that of FIG. 7. Thus, one of the maintained positions is as shown and the other arises after counterclockwise rotation of 60° whereupon the shoulder 78 encounters pin 57. Clockwise rotation of 60° from the position shown allows for momentary action to be provided in that the extremity 72b engages the pin 56 followed by the shoulder 78 engaging the pin 53.

Figure 9:
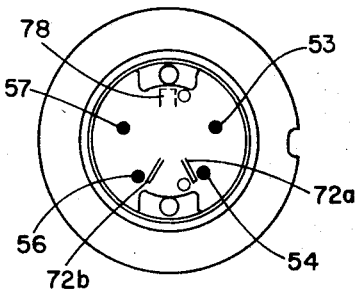

A center-off, two-momentary position mechanism is shown in FIG. 9. The center-off which is a maintained position is shown. Rotation of the mechanism 60° in either direction from that shown causes extremities 72a and 72b to engage pins 54 and 56, respectively, "wind up" of the double ended torsion spring and ultimately engagement of shoulder 78 with pins 57 and 53, respectively.

With an arrangement such as that of FIG. 9, it will be appreciated that the detent arrangement could be dispensed with relying only on the double ended tension spring and pins 54 and 56 to cause return of the mechanism to the off-center position when the actuating force is removed therefrom.

Figure 10:
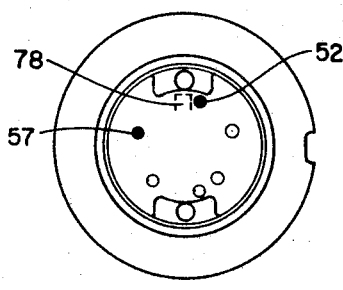
FIGS. 10 and 11 are various views of the invention utilized in two-position configurations incorporating maintained and momentary modes.
Figure 11:
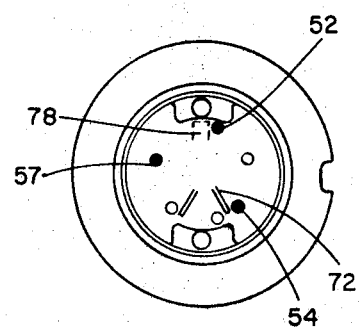

FIGS. 10 and 11 are directed to a two-position rotary actuating mechanism in which 60° of rotation is required to provide the two positions.

A two-maintained position mechanism is shown in FIG. 10 where one of the maintained positions is as shown and the other arises upon 60° counterclockwise rotation. Of course both positions are limited by the engagement of the shoulder 78 with the pins 52 and 57.

A further two-position mechanism is shown in FIG. 11 where a momentary position can be provided. Thus rotation of the mechanism 60° counterclockwise causes engagement of extremity 72a with pin 54 resulting in the "wind up" of the double ended torsion spring followed by engagement of the shoulder 78 with the pin 57. Clockwise rotation of the mechanism from the position shown is of course limited by the pin 52.

From the foregoing, it will be appreciated that various modes, combinations and configurations of a multi-position rotary actuating mechanism are possible by the mere inclusion of return means and the relative location of the elements thereof. It is obvious that not all of the modes, combination and configurations have been disclosed but enough have been to show the versatility of the invention and to provide teachings for one of ordinary skill in the art to provide whatever modes, combinations and configurations are desired. It will be appreciated that the invention has been accomplished utilizing common and inexpensive components which thus makes the mechanism incorporating the invention not only versatile but does not add anything of consequence insofar as cost is concerned.

While the foregoing has set forth the preferred embodiment of the invention, the proper gage of the invention is to be determined from the following claims in which I claim:

1. A multi-position rotary actuating mechanism, the operating mode of which can be selectively maintained, momentary, and maintained-momentary, the combination comprising: a first stationary member; a second movable actuating member associated with and arranged for rotary movement with respect to said first member; said second member movable to discrete positions with respect to said first member; said second member arranged to be held in maintained position by providing detent means which are disposed between said first and second members; said second member arranged to be momentarily positionable with respect to said first member by providing return means including resilient means which are associated with one of said members and pickup means which are associated with the other of said members whereby engagement of and further relative movement between said resilient means and said pickup means provides a force for returning said second member to the point of engagement; the operating mode of the rotary actuating mechanism being determined by the selective inclusion of said detent means, said resilient means and said pickup means and the selective location of said resilient and said pickup means with respect to each other.

2. The combination of claim 1 wherein the amount of rotary travel can be selectively determined by stop means incorporated in the member having the resilient means associated therewith for engagement with selectively located pickup means which may include said first mentioned pickup means.

3. The combination of claim 1 wherein said resilient means is a double ended torsion spring a first extremity of which is limited in movement with respect to the member with which it is associated, the other extremity being arranged to be engaged and moved towards the first extremity by said pickup means in the form of a pin located in an opening provided in the other of said members so as to provide the return force.

4. The combination of claim 3 wherein the amount of rotary travel can be selectively determined by a shoulder in the member having the double ended torsion spring associated therewith for engagement with selectively located pickup pins which may include said first mentioned pin.

5. The combination of claim 3 wherein the extremities of said double ended torsion spring are relatively movable toward each other but limited in movement away from each other and wherein each extremity is arranged to be engaged and moved towards the other extremity by a separate pin so as to provide the return force for opposite rotary movements of the mechanism.

6. The combination of claim 5 wherein said double ended torsional spring is disposed about the axis of rotation of the member with which it is associated and said pins and openings are each disposed at the same radial distance from the axis of rotation in the other of said members.

7. The combination of claim 1 wherein said first stationary member is cup-shaped, said second movable member is manually operable and cylindrically-shaped and arranged to be disposed within the first member and selectively held against removal therefrom.

References Cited

UNITED STATES PATENTS

| | | | |
|---|---|---|---|
| 1,731,612 | 10/1929 | Dunham | 200—67 |
| 2,133,858 | 10/1938 | Hathorn | 200—67 |
| 3,127,786 | 4/1964 | Wooley | 74—527 |
| 3,188,881 | 6/1965 | Pusch | 74—527 |

WESLEY S. RATLIFF, Jr., Primary Examiner

U.S. Cl. X.R.

200—67